United States Patent

Saeman

[15] 3,647,365

[45] Mar. 7, 1972

[54] COARSE LIGHT SODIUM BICARBONATE

[72] Inventor: Walter C. Saeman, Hamden, Conn.

[73] Assignee: Olin Corporation

[22] Filed: Jan. 6, 1970

[21] Appl. No.: 915

[52] U.S. Cl. ................................................23/64, 252/448
[51] Int. Cl. ..................................................C01d 7/10
[58] Field of Search ..............................23/64, 65; 252/448

[56] References Cited

UNITED STATES PATENTS

| 3,188,170 | 6/1965 | Mantz et al. | 23/63 |
| 3,309,171 | 3/1967 | Gancy | 23/63 |
| 276,020 | 4/1883 | Gaskell, Jr. et al. | 23/64 |

FOREIGN PATENTS OR APPLICATIONS 8,314  2/1896  Great Britain..........................23/64 F Primary Examiner—Oscar R. Vertiz
Assistant Examiner—G. O. Peters
Attorney—Gordon D. Byrkit, Donald F. Clements and Thomas P. O'Day

[57] ABSTRACT

Coarse, granular, free-flowing, dust-free, low-density sodium bicarbonate is prepared by hydrating light soda ash (sodium carbonate) to form particles of the desired final size, carbonating in the presence of free moisture to saturation, volatilizing the liberated moisture and recovering coarse, granular, free-flowing, dust-free, low-density sodium bicarbonate of the desired particle size. The sodium bicarbonate is produced in the novel form of hollow beads having apparent density as low as about 20 pounds per cubic foot.

17 Claims, 1 Drawing Figure

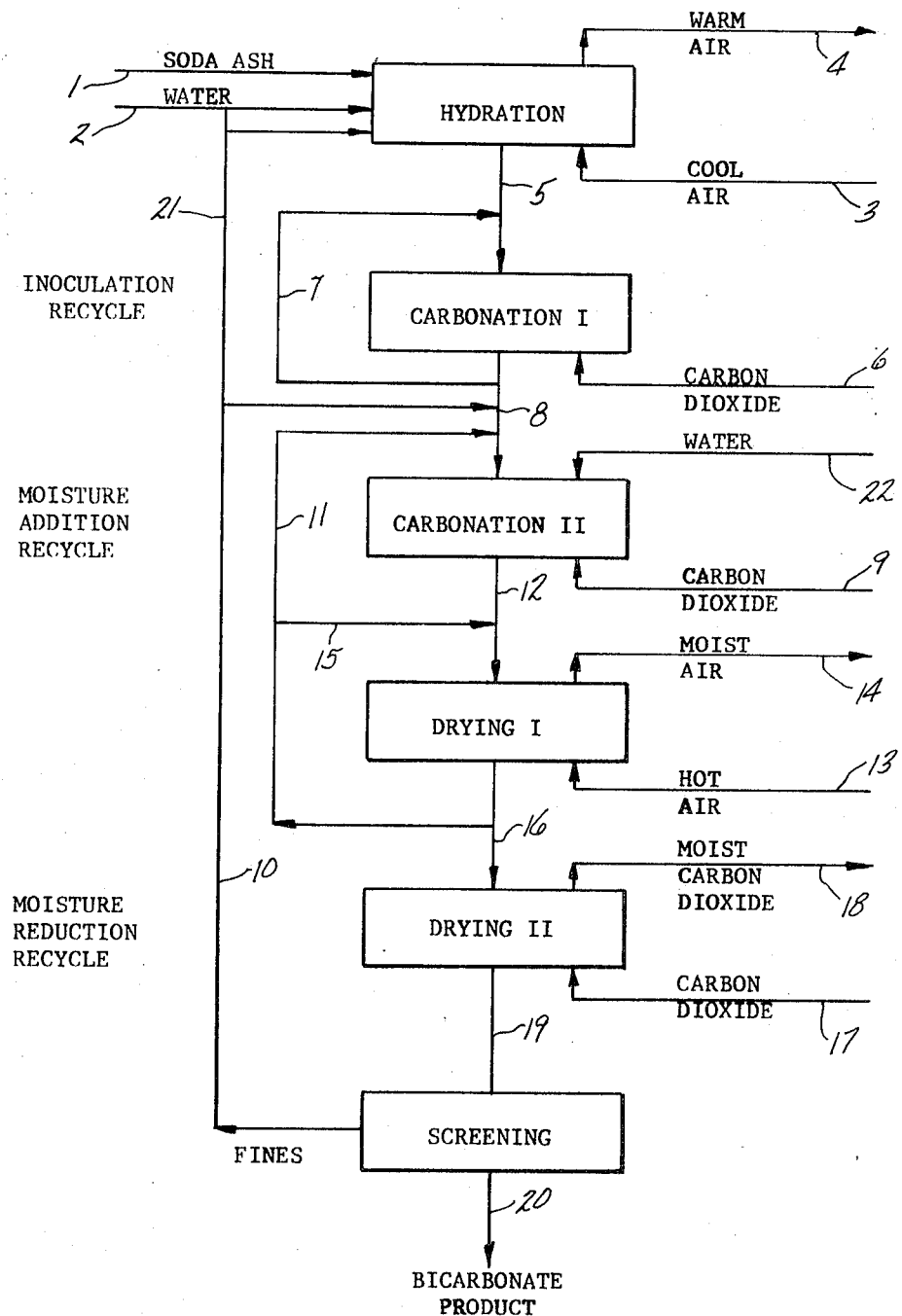

COARSE LIGHT SODIUM BICARBONATE

This invention relates to the production of coarse, granular, free-flowing, low-density sodium bicarbonate.

Sodium bicarbonate is produced commercially in the ammonia soda process by carbonating an ammoniacal solution of sodium chloride. Most of this ammonia-contaminated sodium bicarbonate is calcined to sodium carbonate to volatilize the residual ammonia. Sodium bicarbonate of higher purity is produced by injecting gaseous carbon dioxide into a solution of sodium carbonate of such composition that sodium bicarbonate crystallizes as the solution becomes fully saturated with carbon dioxide. The crystals resulting from either of these processes are very fine and have twinned or dendritic structures which are physically weak and readily disintegrate into finer fragments on handling. Particle sizes are usually finer than 100-mesh U.S. Standard screens. Since the bicarbonate is crystallized from saturated solutions, the product must be further processed to separate mother liquor from the crystals, for example, by centrifuging or filtering. The crystals must then be dried to remove the remaining traces of moisture from the solid. The dried material usually has bulk densities in the range 50 to 60 lb./ft.$^3$.

Special uses for sodium bicarbonate have been developed in which a lower density, coarse granular sodium bicarbonate is desired which is also free-flowing and nondusting. Grain sizes up to one-fourth inch diameter are required with a major fraction of the product larger than 80 mesh with bulk densities of 20 to 45 lb./ft.$^3$. These new physical specifications are well outside the limits of the material previously available and a new, economical method of production is necessary.

Economically, the preferred starting material for the production of the coarse, low-density bicarbonate is the commonly available commercial form of sodium carbonate known as soda ash. It usually has a mesh size through 100 mesh. The method of converting soda ash into sodium bicarbonate must be economically competitive with other alternate methods of producing the desired coarse, granular, low-density bicarbonate.

It is, therefore, a principal object of this invention to produce from dry soda ash a coarse, low-density sodium bicarbonate in which the particle size may be selectively chosen in the range of from 4- to 100-mesh U.S. Standard screens and the bulk density may be selectively chosen in the range 20 to 45 lb./ft.$^3$.

A further object of this invention is to produce the said material at high rates in compact and economical conversion equipment.

A still further object of this invention is to produce the said material with low-cost heating, cooling and evaporation loads as compared to the heating, cooling and evaporation loads for producing sodium bicarbonate by crystallization from saturated solutions.

Another object of this invention is to recover the granular bicarbonate in hard, dust-free form.

Another object of this invention is to provide a process for recycling the fine bicarbonate dust resulting from the attrition of coarser granular material by materials handling during manufacturing and transportation to a suitable step in the process for agglomeration with coarser material.

Anhydrous soda ash readily combines with water at relatively low temperatures to produce hydrated forms of soda ash. Thus, at temperatures below 32° C. the stable hydrate contains 10 moles of water per mole of ash; from 32° to 35.4° C. the stable hydrate has 7 moles of water per mole of ash. From 35.4° to 109° C., the monohydrate is the stable hydrate. Dry hydrates are formed by wetting the ash with limited amounts of uniformly distributed water forming agglomerated hydrates. Under controlled conditions, fine ash may be agglomerated to produce granules of any size desired. The density of the hydrated granules depends on the ratio of water to ash. In the decahydrate the weight ratio of water to ash is 1.7/1.0; in the heptahydrate the ratio is 1.2/1.0 and in the monohydrate the ratio is 0.17/1.0. Mixtures of the deca-, hepta- and monohydrates can therefore be made containing any ratio of water to ash from monohydrate to decahydrate. As this water is volatilized from the final product the bulk volume of the solid hydrate originally formed remains approximately the same while the weight of the product is decreased by the weight of the water volatilized. Thus a wide range of bulk densities of final product can be made using an appropriate ratio of water to ash. Uniform application of water to the soda ash in order to hydrate and agglomerate it is readily effected, for example, by tumbling the ash in a horizontal rotary drum while introducing water by spraying. The rate of ash transport through the drum is preferably quite rapid in relation to fine ash feed so that the increase in diameter of the grains per pass through the drum is approximately 20 percent of the final desired size. Partially agglomerated material leaving the drum is suitably screened to separate the desired grain size for the final product. Undersized grain is recycled through the drum for additional agglomeration until the desired product size is attained. Growth increments per pass through the drum may be in excess of the indicated 20 percent but as this increment is made larger the proportion of oversize material also increases. Decahydrate stored below 32° C. and heptahydrate stored below 35.4° C. appears physically dry. However, material containing decahydrate warmed to 32° C. or material containing heptahydrate warmed to 35.4° C. appears damp due to release of moisture by the transition of the higher hydrate to the lower hydrate. These hydrates in the desired size are also suitably formed by crystallization from saturated solutions of soda ash.

The coarse grains of hydrated ash are converted to grains of sodium bicarbonate by carbonation. The hydrated ash absorbs carbon dioxide at commercially economical rates only in the presence of some free moisture. Free moisture in the hydrated ash is formed by heating the hydrate to the transition temperature to the next lower hydrate or by introducing water, aqueous solution or damp solids in amounts exceeding that needed to form the next higher stable hydrate. Recycle of partially carbonated hydrated ash is another means of providing the necessary amount of free moisture to induce rapid absorption of the $CO_2$. Once the process of $CO_2$ absorption has been initiated, conversion of sodium carbonate to sodium bicarbonate releases the water from the hydrated ash. Water not required to form the bicarbonate provides free water in the mixture and the amount progressively increases until carbonation is complete.

In mixtures containing more than 7 moles of water per mole of soda ash, the amount of free water released by total carbonation to bicarbonate is sufficient to cause further agglomeration in the damp mass. The bicarbonate product does not meet the desired final grain size in the carbonated product. It is necessary to reduce the free moisture content to less than the amount which results in further aggregation of the mass of solids in the carbonator. Intermediate drying of the partially carbonated hydrated ash or other moisture-reducing procedures, for example, recycle of dry carbonated product or fines, are alternate methods of reducing the free moisture content.

Hydrate formation does not occur with sodium bicarbonate and this compound exists only as the anhydrous solid under normal operating conditions. At sufficiently elevated temperatures, however, the bicarbonate tends to lose some carbon dioxide. Final drying is effected at relatively low temperatures preferably below 200° F. and preferably in the presence in an atmosphere of carbon dioxide.

The weight of carbon dioxide added during carbonation partly compensates for the loss of water of hydration. In carbonating ash, the required water to soda ratio is 0.17/1 and the $CO_2$ to soda ratio is 0.415/1. The weight gain due to carbonation is therefore 0.585/1 and the weight loss of water of hydration from the decahydrate is 1.7/1. The net loss in weight by carbonation and dehydration of the decahydrate is therefore 1.115/1 or more than 55 percent of the initial weight of the hydrated ash.

The final density of the bicarbonate product depends in part on the water/ash ratio in the hydrated ash which is variable as described above and in part on the temperature and free moisture concentrations prevailing during carbonation. It is important to maintain the free moisture content below 30 percent but, in the range from 0.001 to 30 percent, it is suitably controlled to produce a final product of the desired apparent density. Basis for these practical considerations are believed to lie in the following discussion of the mechanics of formation of sodium bicarbonate in the form of hollow beads but it is not intended to limit the invention thereby. The hollow beads of this invention are believed to be formed in four stages.

Stage 1

In the initial contact of $CO_2$ with hydrated soda ash, the formation of a shell of trona on the surface of the grain of hydrated soda ash is endothermic and results in a lowering of the grain temperature. The formation of this shell reduces the rate of access of the $CO_2$ to the interior of the grain. Subsequent interaction between the grain and the $CO_2$ atmosphere is then restricted largely to the complete conversion of the superficial shell of trona to bicarbonate. This latter reaction is exothermic and results in a progressive increase in the temperature of the grain.

Stage 2

As the grain temperature passes the transition temperature of heptahydrate at 35.4° C., the hydrate still remaining in the core of the grain separates into solid monohydrate and a saturated solution of sodium carbonate. The outer shell of trona or bicarbonate remains intact in view of its insensitivity to the 35.4° C. transition temperature of the heptahydrate. The solution bleeds from the core through the shell by capillarity. On contact with $CO_2$ at the surface of the shell, additional layers of sodium bicarbonate form until all the liquid leaves the core and is completely carbonated at the surface. The free moisture of the bed increases rapidly in this stage and it is maintained below 30 percent by the means described below to avoid balling or caking.

Stage 3

As the free moisture is removed, the porosity of the shell increases and diffusion of $CO_2$ to the interior of the grain increases until the monohydrate in the interior is completely carbonated to sodium bicarbonate. At this stage the damp beads are weak and require gentle handling.

Stage 4

Finally the free moisture is completely removed without disintegrating the hollow bead product. As the moisture is removed the physical strength of the beads increases to form a final bead which is sturdy to shipping and handling.

Formation of hollow beads of sodium bicarbonate is promoted by rapid carbonation to form the initial shell, rapid diffusion of liquid from the core at temperatures above 35.4° C. and rapid carbonation at the surface combined with rapid removal of free moisture to prevent agglomeration.

Carbonation is suitably, though not necessarily, divided into at least two stages to avoid liberation of free moisture sufficient to cause any substantial further aggregation or balling of the material in the tumbling bed. In carbonating heptahydrate at temperatures below 35.4° C., more than 50 percent of the total $CO_2$ required can be injected without encountering any undesirable aggregation. Greater proportions of $CO_2$ are suitably injected into monohydrate and mixtures of mono- and heptahydrate in the initial stage. Less than 50 percent of the total $CO_2$ required is preferably injected into mixtures of heptahydrate and decahydrate.

In a particularly advantageous mode of practicing the invention, the heptahydrate or decahydrate or mixtures thereof, formed in the desired final size distribution, is first carbonated to the extent of at least about 5 percent at temperatures below the 35.4° C. transition temperature of the hydrate when the mixture contains principally heptahydrate and 32° C. when the mixture contains substantial amounts of decahydrate to form a shell of trona on the hydrate particles which prevents aggregation. Then the carbonation is completed at temperatures above 35.4° C. and the bicarbonate product is finally dried.

The carbonation gas introduced is suitably carbon dioxide or mixtures of carbon dioxide and inert gas, for example, nitrogen or air in any desired proportions. Advantageously, the carbonation gas is dry and suitably it is a recycle mixture of air and carbon dioxide which has been dried, and if necessary, refortified with carbon dioxide and warmed, for example, to 40° C. or higher. Carbonation in two stages with intervening drying is usually not necessary when using warm, dry mixtures of air and carbon dioxide. Carbonation and drying occur simultaneously in a single stage without aggregation and carbonation suitably continues to completion without interruption. If desired, however, the partially carbonated mixture is reduced in moisture content to less than 30 percent free moisture by any suitable means, for example, vaporizing moisture by passing a stream of warm air over the bed or by mixing dried bicarbonate with the bed. Then the carbonation is completed.

In one mode of practicing the invention, sufficient dry bicarbonate product or product fines are mixed with the damp material after each carbonation stage to reduce the moisture content below the level inducing any additional aggregation. The ratio of recycled dry material depends on the initial ratio of water to ash in the hydrate and varies from substantially zero up to five times as much recycle as product from the process. Balling of the grain in the bed due to excessive moisture also reduces the contact area between the solids and the carbon dioxide, slowing the $CO_2$ absorption rate.

Two stages of carbonation with one stage of moisture reduction are usually ample to produce quality product of the desired size particles. Any additional number of alternating stages of carbonation and moisture reduction are also suitably used.

In the final drying stage, free moisture is removed from the bicarbonate under conditions avoiding excessive decomposition of the bicarbonate. Advantageously the bicarbonate is dried at low temperatures in an atmosphere of $CO_2$ gas. However, drying costs are increased at lower temperatures and more economical drying results by initially drying at a relatively higher temperature to remove the major portion of the moisture even if accompanied by partial decomposition of the bicarbonate. A second drying stage in a $CO_2$ atmosphere restores any $CO_2$ lost during the high-temperature drying stage. These temperatures are suitably below 200° F.

Finally for product quality control, the granular material is screened to remove both oversize and undersize material. Crushed oversize together with the fines are suitably used in partial fulfillment of the dry recycle requirements for the final stage of carbonation of the hydrated ash or for cementing the damp ash in the carbonation to form aggregates of the desired size in the final product.

The accompanying FIGURE shows a flow sheet of the process of this invention.

In the hydration step, fine soda ash is introduced via line 1 and water via line 2 to agglomerate the fine ash into hydrated particles of approximately the size required for the final bicarbonate product. Bicarbonate fines are suitably recycled via line 21 and incorporated in the hydration mixture either directly or by dissolving the fines in the water used for hydration. Heat released during the hydration of the soda is removed by circulation of air to the hydration mixture via line 3 and out via line 4 to maintain the temperature below the decomposition temperature of the hydrate.

Hydrated ash from the hydration drum is then conveyed via line 5 to the initial carbonation stage, suitably in a horizontal rotating drum for tumbling the granular hydrate to expose it effectively to the $CO_2$ introduced into the drum atmosphere via line 6. An inoculation recycle stream of warm, damp, partially carbonated material is also fed to the initial stage of carbonation via line 7 to provide the moisture and/or temperature rise required to induce rapid $CO_2$ absorption in this stage of the process. Partially carbonated ash is transferred via transfer line 8 to the final carbonation stage. Carbon dioxide is introduced to carbonation stage II via line 9.

Between the two carbonation stages, recycle fines are introduced via line 10 and partially dried bicarbonate via line 11 into transfer line 8 as necessary to maintain suitable moisture content in the final carbonation stage. The fully carbonated product is transferred via line 12 to the first stage drier where heated air introduced via line 13 rapidly removes most of the free moisture via line 14. Partially dried material is transferred to drying stage II via line 16. A portion of the partially dried bicarbonate is suitably recycled to drying stage I via line 15 to further reduce the moisture content of the feed to the drier.

An alternative to the use of partially carbonated damp ash for initiating $CO_2$ absorption is direct injection of a small amount of "trigger" water via line 22. The "trigger" water is suitably in the form of water alone or a solution of sodium bicarbonate fines. When "trigger" water is injected via line 22, then line 7 for recycle of damp, partially carbonated ash is ordinarily not necessary and the carbonation is suitably conducted in a single stage.

In drying stage II, carbon dioxide is introduced via line 17 and moisture is removed via line 18. Dried bicarbonate is transferred via line 19 to screens, fines are recycled via line 10 and product of the desired size is removed via line 20.

Table I shows typical quantities of major components of the process in related lines of the drawing. For 1,000 pounds of bicarbonated product, 630 pounds of ash is introduced via line 1. The water of hydration required to form the heptahydrate is 750 pounds introduced via line 2. Half the required carbon dioxide, 131 pounds, is introduced via line 6 to carbonate the 1,380 pounds of heptahydrate introduced into the first carbonation stage via line 5. The resulting damp, partially carbonated material is transferred via line 8 to carbonation stage II with dry recycled fines from line 10. About 928 pounds of this recycle is required to increase to the bed weight to 2,570 pounds and to maintain the free moisture content at complete carbonation at about 25 percent. This maintains the integrity of the initial grain structure and prevents the grain in the bed from balling. Additional carbon dioxide is introduced via line 9. The 1,000 pounds of fully carbonated product containing 642 pounds of water is transferred via line 12 to the first stage dryer. Substantially all the water is removed via line 14 from the first stage dryer and only minor amounts from the second stage dryer. These amounts show throughput excluding amounts recycled.

TABLE I

Flow Rates of Major Components Exclusive of Recycle Streams

Basis: 1,000 Pounds $NaHCO_3$

| Component/Line | 1 | 2 | 5 | 6 | 8 |
|---|---|---|---|---|---|
| Ash ($Na_2CO_3$) | 630 | — | — | — | — |
| Water | — | 750 | — | — | 321 |
| $CO_2$ | — | — | — | 131 | — |
| Ash (Hydrated) | — | — | 1380 | — | 690 |
| $NaHCO_3$ | — | — | — | — | 500 |

| Component/Line | 9 | 12 | 14 | 16 | 20 |
|---|---|---|---|---|---|
| Ash ($Na_2CO_3$) | — | — | — | — | — |
| Water | — | 642 | 642 | — | — |
| $CO_2$ | 131 | — | — | — | — |
| Ash (hydrated) | — | — | — | — | — |
| $NaHCO_3$ | — | 1,000 | — | 1,000 | 1,000 |

The accompanying FIGURE shows a plurality of stages with material transfer between stages. Other embodiments of the process are also contemplated in which a single rotating drum is equipped with lines for practicing the several stages therein consecutively. Hydration of soda ash by water injection, partial carbonation, intermediate drying by hot air with introduction of recycle fines, complete carbonation, drying with hot air and then by carbon dioxide are all suitably accomplished in a single drum discharging the product to sieves. Also contemplated is single stage complete carbonation with continuous or intermittent drying and/or recycle of dry fines and single stage drying first with hot air and later with $CO_2$ at lower temperatures.

Completely continuous operation is contemplated in which the hydrated soda ash is continuously formed by hydrating dry soda ash; the hydrated soda ash is continuously carbonated in a first carbonation stage with 30 to 50 percent of the carbon dioxide required for complete carbonation; the free moisture is introduced by recycle damp carbonated ash; the percent of free moisture is continuously maintained by incorporating dry sodium bicarbonate; continuously completing the carbonation of the reaction mixture; continuously volatilizing the free moisture from the resulting completely carbonated reaction mixture; thereby continuously producing sodium bicarbonate having the desired bulk density and particle size.

The product of this invention is a novel form of sodium bicarbonate consisting largely of hollow beads having especially low apparent densities of 20 to 45 pounds per cubic foot. THey dissolve more rapidly than other forms and are especially suitable for use in detergent compositions because of their quick-dissolving characteristics.

EXAMPLE I

Hydration

A drum 10 inches in diameter and 12 inches long rotating about its horizontal axis at 36 r.p.m. was charged with 1 kg. of minus 20-mesh heptahydrate. The exterior surface of the drum was air cooled to 20° C. to prevent the bed from exceeding the decomposition temperature of the decahydrate at 32° C. Intermittent additions of anhydrous light ash and water in the weight ratio of 1.0/1.2 were alternately made to the bed as fast as the heat of hydration could be removed. When the bed reached a total weight of 1.2 kg., the product was screened to remove 20 percent of the largest grain (plus 20-mesh) and the 1 kg. undersize was returned to the drum as a source of seed grain for further operation. The feed of light soda ash and water was then resumed as described above until the bed weight again amounted to 1.2 kg. Additional plus 20-mesh grain was screened out and the fines returned. Repetition of this sequence produced minus 14- plus 20-mesh heptahydrate on a sustained basis.

Carbonation

A 1.38 kg. portion of heptahydrate grain prepared as described above was charged to the emptied 10- by 12-inch rotary drum used for hydration. The hydrated grain was moistened by injection of 10 g. of water onto the bed and was then exposed to a $CO_2$ atmosphere. After the absorption of 0.131 kg. of $CO_2$, the grain in the bed contained 21.2 percent free moisture and began to appear damp. During the endothermic stage of this reaction, the bed cooled to 15° C. and subsequently in the exothermic stage heated to 50° C. One kilogram of dry bicarbonate was blended with the damp bed and carbonation was continued to saturation with an additional 0.131 kg. of $CO_2$. At this time the grain in the bed again appeared damp but actual balling did not occur. The moisture concentration was 24.6 percent. The total mass of 2 kg. of sodium bicarbonate containing 0.652 kg. of water was then exposed to warm air at 40° C. in the 10- by 12-inch drum to volatilize the moisture at low temperature. After 60 minutes of drying the loss in weight was 0.652 kg. and the weight of recovered bicarbonate was 2.0 kg. The particle size of the recovered product was minus 14 plus 20 mesh, the same as that of the original hydrated ash and the dry recycled grain used to prevent balling of the grain during the carbonation stage of the process. The bulk density of the recovered product was 31 lb./ft.$^3$. Microscopic examination showed that the product was in the form of hollow beads.

EXAMPLE II

Carbonation

An additional 1.38 kg. portion of heptahydrate grain from Example I was placed in the 10- by 12-inch rotary drum used above. The dry hydrated grain was exposed to $CO_2$ atmosphere. No absorption occurred and no weight gain was recorded until an additional 0.75 kg. of damp material carbonated to 50 percent saturation from a previous test was admixed with the dry bed. Absorption of $CO_2$ was initiated immediately. During the endothermic stage of reaction, the bed temperature declined to 18° C. and, during the exothermic stage, it rose to 45° C. Following the absorption of 0.131 kg. of $CO_2$ over a 5-minute period, the $CO_2$ atmosphere was temporarily displaced with air and 1.5 kg. of dry bicarbonate grain was blended into the damp bed. The $CO_2$ atmosphere was then restored and carbonation progressed to saturation with the absorption of a total of an additional 0.065 kg. of $CO_2$ in 10 minutes. Of the total of 0.196 kg. of $CO_2$, 0.131 kg. was required to saturate the 1.38 kg. portion of hydrated ash initially charged and 0.065 kg. of $CO_2$ was required to complete the carbonation of the 0.75 kg. of damp 50 percent carbonated material used to initiate the $CO_2$ absorption in the drum. At the end of the carbonation there remained 3.963 kg. of damp material containing 0.963 kg. of water (24.3 percent $H_2O$) and 3.0 kg. of bicarbonate of soda. Of the 3.0 kg. of bicarbonate of soda, 1.0 kg. resulted from the carbonation of the initial portion of hydrated soda; 0.5 kg. resulted from the complete carbonation of 0.75 kg. of damp 50 percent carbonated material and 1.5 kg. represents the dry recycle used to maintain the moisture content moisture during the carbonation step at 24.3 percent. The bulk density of the recovered product was 32 lb./ft.$^3$. Microscopic examination showed that the product consisted of hollow beads of sodium bicarbonate.

EXAMPLE III

Carbonation

An additional 1.38 kg. portion of heptahydrate grain from Example I was placed in the 10- by 12-inch rotary drum used above. The dry hydrated grain at 30° C. was exposed to warm $CO_2$ at 40° C. No absorption of $CO_2$ occurred until the bed warmed to 35.4° C., the transition temperature from heptahydrate to monohydrate, and released water of hydration as free moisture. At this time rapid $CO_2$ absorption was initiated and the bed temperature dropped to 25° C. When 0.131 kg. of $CO_2$ has been absorbed, the temperature had risen to 45° C. The bed was diluted with 1.0 kg. of dry bicarbonate grain and carbonation was continued to saturation with the absorption of an additional 0.131 kg. of $CO_2$. The damp mass containing 2.0 kg. of bicarbonate and 0.642 kg. of water (24.3 percent $H_2O$) was then dried to remove the 0.642 kg. of water by volatilization. The dried bicarbonate grain was recovered in the original minus 14 plus 20 mesh size range without appreciable agglomeration into larger pellets. The bulk density of the recovered product was 28 lb./ft.$^3$. Microscopic examination showed that the product consisted of hollow beads of sodium bicarbonate.

EXAMPLE IV

Carbonation

An additional 1.38 kg. portion of heptahydrate grain from Example I was placed in the 10- by 12-inch rotary drum used above. The dry hydrated grain was exposed to warm $CO_2$ at 40° C. When the bed warmed to 35.4° C., the transition temperature of heptahydrate to monohydrate, $CO_2$ absorption was initiated by release of water of hydration. Endothermic and exothermic effects were observed as before. After 0.131 kg. of $CO_2$ had been absorbed (21.2 percent $H_2O$), the $CO_2$ atmosphere was replaced with warm dry air at 40° C. until the loss in weight due to volatilization of moisture was 0.160 kg. or approximately 50 percent of the hydrate water released by bicarbonate formation. The absorption of $CO_2$ was resumed to 75 percent of final $CO_2$ saturation and then suspended (22.1 percent $H_2O$ in the bed) while an additional 0.160 kg. of water was volatilized to avoid excessive dampness of the bed in the carbonator. The $CO_2$ atmosphere was then restored and continued to final saturation of bed with $CO_2$. At this time the bed containing 0.322 kg. of moisture and 1.0 kg. of sodium bicarbonate (24.4 percent $H_2O$). It was not sufficiently damp to induce balling. The damp mass was then exposed to dry warm air for 60 minutes to volatilize the residual moisture leaving 1 kg. of dry sodium bicarbonate in the size range minus 14 to plus 20 mesh. The bulk density of the recovered product was 33 lb./ft.$^3$. Microscopic examination showed that the product consisted of hollow beads of sodium bicarbonate.

EXAMPLE V

Hydration

Sodium carbonate decahydrate crystals in the size range minus 14 plus 20 mesh were grown from saturated solution. These crystals (1.7 kg.) were charged to the rotary drum used above.

Carbonation

The decahydrate charged contains 1.07 kg. of crystal water and 0.63 kg. of soda which on complete carbonation by 0.262 kg. $CO_2$ produces 1.0 kg. of bicarbonate. Absorption of $CO_2$ in the decahydrate mass was initiated by injection of 10 g. of water onto the surface of the bed. When 0.084 kg. of $CO_2$, only one-third of the $CO_2$ required to saturate the decahydrate, was absorbed, the mass appeared sufficiently damp to induce incipient agglomeration. The water of hydration released was 0.321 kg. which corresponds to 18 percent $H_2O$ based on the 1.784 kg. total weight of the bed. Further absorption of $CO_2$ was discontinued while 2.318 kg. of dry granular bicarbonate was blended in. Carbonation was completed resulting in a bed weight of 4.280 kg. consisting of 0.963 kg. of free moisture, 1.0 kg. of bicarbonate from the decahydrate and 2.318 kg. of recycled dry bicarbonate. The water content of the bed was 22.5 percent. The entire bed was dried at low temperature to volatilized free moisture and to recover 3.318 kg. of dry granular bicarbonate having a bulk density of 27 lb./ft.$^3$. Microscopic examination showed that the product consisted of hollow beads of sodium bicarbonate.

EXAMPLE VI

Hydration

A drum 3 feet in diameter and 6 feet long rotating at 15 r.p.m. about its horizontal axis was charged with a bed of 100 pounds of hydrated soda ash having particles less than 30 mesh in size. Attached to the interior wall of the drum were 16 radial flights 1 inch high to prevent the bed from skidding on the interior walls as the drum was rotated. Because of these flights the bed was also elevated and cascaded. An atomizing spray was located midway of the drum and was offset from the axis away from the bed. The spray directed atomized water transversely into the cascading curtains of granular hydrated soda at the rate of 80 lb./hr. Anhydrous sodium carbonate was fed to the bed continuously or in small, frequent increments at rates from 65 to 100 lb./hr. thereby varying the mole ratio of water to sodium carbonate from 7.2/1 to 4.7/1. The temperature of the bed was maintained below 32° C., the decomposition temperature of the decahydrate, by the circulation of cool ambient air at 20° to 25° C. through the drum as the hydration progressed. The discharge from the end of the drum was circulated at from 10 to 20 lb./min. over 30- and 40-mesh screens in series. The plus 30-mesh oversize was fed to a crusher and reduced to minus 40-mesh and recycled to the screens. The minus 30-mesh plus 40-mesh fraction was taken as product. The minus 40-mesh fraction was recycled to the feed end of the drum to provide nuclei for further growth. Under these conditions, about 1 pound of minus 40-mesh undersize was recycled to the feed end of the hydration drum for each pound of product removed. This recycle, together with the anhydrous soda fed directly to the bed, sustained the volume of the bed at the 100-pound starting level and permitted continuous, steady state operation.

Carbonation

A drum 3 feet in diameter and 6 feet along rotating at 5 r.p.m. about its horizontal axis and preheated to 45° C. was charged with a bed of 100 pounds of hydrated soda ash having particles in the range minus 30 mesh plus 40 mesh. The ratio of water to sodium carbonate in the hydrated soda ash was 4.7/1. One end of the drum was sealed with a removable transparent cover and the other was sealed except for an opening to admit concentric ducts for the circulation of heated drying air through the interior of the drum. Attached to the interior surface of the drum were 16 radial flights 1 inch high to prevent skidding of the bed and to provide for elevation and cascade of material in the bed. Provision was also made for injection of $CO_2$ into the drum atmosphere. As the hydrate was transferred into the warm drum, $CO_2$ was also admitted. Sufficient of the cool hydrate, in contact with the warm drum was heated to the transition temperature of 35.4° C. to release water of hydration and initiate absorption of $CO_2$, forming a shell of trona on the surface of the hydrate particles. $CO_2$ was injected intermittently at rates of 0.5 to 1 lb./min. until substantially all of the hydrate particles were covered by a shell of trona.

These changes were indicated by reversal of temperature trends in the bed. During injection of the initial 5 pounds of $CO_2$, equivalent to approximately 25 percent of the total $CO_2$ requirement, the bed temperature dropped from 35.4° to 26° C. due to the endothermic absorption of $CO_2$ to form trona. Carbonation was continued until it exceeded the trona composition at the surface of the particles. The exothermic absorption of $CO_2$ to form bicarbonate raised the bed temperature to 35.4° C. The cumulative absorption at this point was 7 pounds of $CO_2$, equivalent to approximately 30 percent of the total $CO_2$ requirement.

When 50 percent of the total $CO_2$ was absorbed, the bed temperature was 55° C. and the bed moisture level was sufficient to induce sticking and incipient balling. Warm air circulation to the bed reduced the bed temperature to 40° C. within 2 minutes by volatilization of moisture. Addition of 50 pounds of dry minus 40-mesh bicarbonate fines raised the bicarbonate in the bed to 138 pounds on an anhydrous basis and reduced the moisture content to 19.5 percent, below the limit at which excessive balling and adhesion occurs. Further injection of $CO_2$ was continued until the bed temperature again approximated 55° C., followed by cooling to 40° C. After a third cooling cycle, analysis indicated that the bed was fully carbonated by the injection of a total of 23 pounds of $CO_2$. Total exposure time of carbonation was 1 hour.

Free moisture was volatilized from the stationary bed in the drum by circulating dry air heated to 60° C. and carrying 15 percent of $CO_2$. Further agitation was avoided but the bed was shifted by one-half turn of the drum at 10-minute intervals. After 8 hours, the moisture content of the bed was less than 1 percent. The product was then rescreened to recover the minus 30- plus 40-mesh fraction which amounted to 65 pounds of sodium bicarbonate having a bulk density of 25 pounds per cubic foot. Microscopic examination showed beads having a smooth, continuous outer shell with a hollow core. The remainder of the bed consisted of 73 pounds of minus 40-mesh fines including 50 pounds of fines mixed into the bed during carbonation. The theoretical yield of minus 30- plus 40-mesh product recoverable from the 100 pounds of minus 30- plus 40-mesh starting hydrate was 88 pounds. Actual yield was about 79 percent of theory. Breakage of the hollow core grains during the final stages of carbonation of the hydrated soda and the drying of the carbonated product accounts for the balance.

EXAMPLE VII

Carbonation

The drum used in Example VI, preheated to 45° C., was charged with 50 pounds of minus 20- plus 30-mesh hydrated soda ash having a water/$Na_2CO_3$ mole ratio of 4.7. The drum was operated at 10 r.p.m. while carbonating. The minimum bed temperature during the endothermic phase of carbonation was 23° C. Subsequently two 50-pound additions of dry bicarbonate fines, warmed to 40° C., were made to keep the bed in a free-flowing condition. The bed temperature did not exceed 40° C. due to a slow rate of carbonation and exothermic heat release. Exposure to $CO_2$ was continued for 4 hours to attain complete carbonation of the bed. The low moisture concentration maintained during carbonation permitted $CO_2$ to diffuse more readily into the interior of the hydrated grain and this transformed a larger portion of the core to the temperature-insensitive trona form. Although the temperature subsequently exceeded the 35.4° C. transition temperature of the heptahydrate, less soda ash solution was then available for transfer through the outer shell. After drying, 40 pounds of minus 20- plus 40-mesh granular bicarbonate was recovered. The density of this material was 40 pounds per cubic foot. Microscopic examination showed a hollow core structure but the cavities were substantially smaller than in the product of Example VI. The theoretical yield of minus 20- plus 40-mesh product recoverable from the 50 pounds of starting hydrate was 44 pounds and the actual yield was 91 percent.

What is claimed is:

1. A method for producing coarse, light sodium bicarbonate in the form of hollow beads having bulk density from 20 to 45 pounds per cubic foot and particle size plus 100-mesh U.S. Standard screens by carbonating hydrated soda ash which is a mixture of hydrates of soda ash containing free moisture and which has particle size plus 100 mesh with gaseous carbon dioxide initially at a temperature below about 35.4° C. and finally at a temperature above about 35.4° C. while maintaining from 0.001 to 30 percent by weight of free moisture in the reaction mixture until said reaction mixture is completely carbonated; volatilizing said free moisture and producing sodium bicarbonate in the form of hollow beads having said bulk density and particle size.

2. Method as claimed in claim 1 in which said free moisture is introduced by adding water to dry soda ash in excess of the amount required to form said hydrated soda ash.

3. Method as claimed in claim 1 in which said free moisture is introduced by adding damp, carbonated, hydrated ash.

4. Method as claimed in claim 3 in which said damp ash is partially carbonated.

5. Method as claimed in claim 1 in which said free moisture is introduced by heating said hydrated ash above the temperature of transition of said hydrated ash to a lower hydrate.

6. Method as claimed in claim 1 in which said hydrated soda ash contains from 1 to 10 moles of crystal water per mole of soda ash.

7. Method as claimed in claim 6 in which said hydrated soda ash is formed by hydrating dry soda ash at temperatures below 109° C.

8. Method as claimed in claim 7 in which said hydrated soda ash is formed by hydrating dry soda ash at temperatures below 35.4° C. and said hydrated soda ash contains from 7 to 10 moles of crystal water per mole of soda ash.

9. Method as claimed in claim 1 in which said free moisture is volatilized simultaneously while carbonating said hydrated soda ash.

10. Method as claimed in claim 1 in which said hydrated soda ash is carbonated in a first carbonation stage with 30 to 50 percent of the carbon dioxide required for complete carbonation, said free moisture is reduced to below 30 percent of said reaction mixture and said carbonation is completed in a second carbonation stage.

11. Method as claimed in claim 10 in which said free moisture in said reaction mixture is reduced between said carbonation stages by volatilization.

12. Method as claimed in claim 10 in which said free moisture in said reaction mixture is reduced between said carbonation stages by incorporating dry sodium bicarbonate.

13. Method as claimed in claim 1 in which carbonation is initiated at temperatures below 35.4° C. until the hydrated soda ash is at least 5 percent carbonated and the carbonation is completed at temperatures above 35.4° C.

14. Method as claimed in claim 13 in which the carbonation gas introduced is a dry mixture of air and carbon dioxide.

15. Method as claimed in claim 1 in which said reaction mixture is completely carbonated and said free moisture is volatilized therefrom in at least two stages including a first stage in which free moisture is volatilized by passing over said completely cirbonated reaction mixture a stream of air at a temperature below 200° F. to form a partially dried product and a final stage in which said partially dried product is finally dried in a stream of carbon dioxide containing gas at a temperature below 200° F.

16. Method as claimed in claim 1 in which said hydrated soda ash is continuously formed by hydrating dry soda ash; said hydrated soda ash is continuously carbonated in a first carbonation stage with 30 to 50 percent of the carbon dioxide required for complete carbonation; said free moisture is introduced by recycling damp carbonated ash; said percent of free moisture is continuously maintained by incorporating dry sodium bicarbonate; continuously completing the carbonation of said reaction mixture; continuously volatilizing said free moisture from the resulting completely carbonated reaction mixture; thereby continuously producing sodium bicarbonate having said bulk density and particle size.

17. Sodium bicarbonate in the form of hollow beads having apparent density from 20 to 45 pounds per cubic foot.

* * * * *